Patented July 12, 1949

2,475,916

UNITED STATES PATENT OFFICE 2,475,916

ALKYL-SUBSTITUTED AROMATIC-ALIPHATIC CARBOXYLIC ACID

Orland M. Reiff, Ferdinand P. Otto, John J. Giammaria, and Edward A. Oberright, Woodbury, N. J., assignors to Socony-Vacuum Oil Company, Incorporated, a corporation of New York No Drawing. Application December 21, 1943, Serial No. 515,152

9 Claims. (Cl. 260—413)

This invention has to do with new chemical compounds or reaction products which may be generally designated as alkylated aromatic-aliphatic carboxylic acids or as alkyl-substituted aryl-aliphatic carboxylic acids. Although the invention is broadly concerned with chemical compounds or compositions coming within the above-designated general classification, it contemplates as a preferred group coming within such general classification those compounds or condensation products which are soluble or miscible with mineral oil.

Our invention is predicated upon the discovery that the oil-miscible compounds or condensation products contemplated herein when blended with a viscous mineral oil fraction, such as a hydrocarbon lubricating oil, will improve the oil in various respects. For example, we have found that the compounds or reaction products contemplated herein will improve the viscosity and pour point of the oil.

The alkyl substituent on the aryl nucleus of the compounds or condensation products contemplated herein act to impart oil-miscibility to the product and for the preferred general class of oil-miscible compounds this alkyl substituent should contain at least twenty carbon atoms. This especially-preferred sub-group of compounds having the so-called "heavy alkyl groups" of at least twenty carbon atoms (such as are derived, for example, from a Friedel-Crafts condensation with chlorinated paraffin wax) act to improve the characteristics of the oil noted above.

Since the oil-miscibility or solubility of these compounds or condensation products is controlled or governed by the heavy alkyl substituent, the extent to which the aromatic nucleus is substituted with these heavy alkyl groups becomes an important factor in obtaining products having the desired properties. This degree of substitution in the aromatic nucleus will vary more or less depending upon the aliphatic hydrocarbon group which carries the carboxyl radical—that is, whether such group is a short or long chain hydrocarbon group—and will also vary depending upon whether or not the aromatic nucleus is mono- or poly- cyclic and whether such nucleus carries other substituents. In general, it may be said, however, that the aromatic nucleus should have at least one of the nuclear hydrogen atoms substituted with an aliphatic hydrocarbon group containing at least 20 carbon atoms, and it is preferable that the average composition of these complex organic acids should be such that the aromatic nucleus carries two or three heavy alkyl groups. In case the aliphatic constituent in the alkyl-carboxyl radical is of high molecular weight—that is, of the type derived from stearic acid—the degree of heavy alkyl or wax-substitution may be less than is required to give the same properties to a compound in which the alkyl-carboxyl group is derived from a low molecular weight acid such as acetic acid.

It is to be understood that the present invention is not concerned with mineral oil compositions, such compositions forming the subject matter of copending applications Serial No. 467,058, filed November 26, 1942, now abandoned, and Serial No. 314,794, filed January 20, 1940 (now Patent No. 2,316,889, issued April 20, 1943), to which reference is made for further details in the composition of these compounds or reaction products.

It is also to be understood that the present invention is not confined to the oil-miscible or oil-soluble compounds and that the use of the preferred oil-miscible compounds is not confined to the improvement of mineral oils, since this whole class of new materials is possessed of valuable properties irrespective of oil-solubility. For example, the compounds or condensation products contemplated herein may be used as intermediates in the production of resins, resin-like materials, rubber substitutes, etc. Certain of the compounds or compositions are possessed of valuable pharmaceutical, insecticidal or similar properties. Numerous other uses and applications of the compounds or condensation products contemplated herein will be readily apparent to those skilled in the art from the following description of their compositions and typical methods for synthesizing them.

As aforesaid, the compounds or condensation products contemplated herein may be broadly designated as the alkyl-substituted aryl-aliphatic carboxylic acids. Thus, a typical compound or condensation product of the type contemplated herein may be represented by the general formula:

I.

wherein R represents an aliphatic hydrocarbon group; $x$ represents an integer from 1 to 5; Z represents an organic radical, or, more specifically, an aliphatic or cyclo-aliphatic hydrocarbon group, which is substituted for one of the nuclear hydrogen atoms in the aromatic nucleus. It will be observed that this compound is a condensation product of an alkyl-substituted aromatic compound and an aliphatic or cyclo-aliphatic carboxylic acid, wherein at least one nuclear hydrogen atom on the aromatic nucleus is substituted with an "alkyl-carboxyl" radical and wherein at least one other nuclear hydrogen atom is substituted with an aliphatic hydrocarbon radical.

It is to be understood, of course, that the aryl nucleus (disclosed in the formula above as a substituted phenyl group) may be either mono- or poly- cyclic; also that it may carry other substituents, such as ester, keto, alkoxy, alkyl sulfide, aryl sulfide, halogen, amino, etc., as more fully disclosed in application Serial No. 314,794.

It is to be further understood that the term "aliphatic carboxylic acids" used hereinafter is inclusive of cyclo-aliphatic carboxylic acids, and may be derived from the corresponding organic acids of various molecular weights.

The general procedure for synthesizing the alkyl-substituted aryl-aliphatic carboxylic acids is to first form the alkyl-substituted aromatic compound and then substitute one of the nuclear hydrogen atoms of the aromatic nucleus with an aliphatic carboxylic acid group such that a carbon atom of the aliphatic radical of the aliphatic carboxylic acid group is directly attached to a carbon atom of said aromatic nucleus.

Specific procedures which may be followed in effecting the condensation between the alkyl-substituted aromatic compound and the aliphatic acid are as follows:

(a) Condensation of an alkylated aromatic or an hydroxy-aromatic compound with an unsaturated aliphatic acid such as oleic acid, using a so-called kationoid catalyst such as sulfuric acid, zinc chloride, aluminum chloride, etc., to effect the addition of the unsaturated acid to the aryl nucleus.

(b) Condensation of an alkylated aromatic or hydroxyaromatic hydrocarbon with an halogenated aliphatic or cycloaliphatic acid, such as chloracetic, chlorstearic and chlornaphthenic acids, by means of the Friedel-Crafts reaction using anhydrous aluminum chloride as the preferred catalyst.

(c) In the case of acids of the type contemplated herein which contain a hydroxyl substituent in the aromatic nucleus, such acids may be prepared by a re-arrangement of the corresponding alkylated aryl ether aliphatic acids in the presence of a kationoid catalyst such as HCl gas.

(d) Hydroxyaryl-aliphatic acids can be converted to the corresponding ether aryl-aliphatic acids by methylating the hydroxyl group by reaction with alkylating agents like dimethyl sulfate or alkyl halides or by reaction with arylating agents such as aryl halides.

In the event a compound is desired in which the aromatic nucleus contains as a substituent alkoxy, ester, nitro, or amino groups, it is necessary to introduce such groups into the compound after the condensation with the aliphatic acid has been completed.

Methods for the introduction of such substituents will be apparent from methods described in my aforesaid copending application Serial No. 314,794.

The alkylation of the aromatic compound may be carried out in various ways. A preferred procedure is to subject an aromatic compound, or a hydroxyaromatic compound which contains an hydroxyl group on the aromatic nucleus, to a Friedel-Crafts condensation reaction with a halogenated aliphatic hydrocarbon, which for obtaining the preferred multi-functional addition agents should be an aliphatic hydrocarbon containing at least twenty carbon atoms or a mixture of aliphatic compounds predominantly comprised of compounds having at least twenty carbon atoms. This alkylation may also be carried out with unsaturated hydrocarbons or aliphatic alcohols, using $H_2SO_4$ or anhydrous aluminum chloride as a catalyst. In alkylating phenols with high molecular weight alcohols, however, it is preferred to convert the alcohol to the corresponding halide (or polyhalide) and then condense the alkyl halide with the hydroxyaromatic compound by the Friedel-Crafts reaction. For obtaining the preferred multi-functional addition agent with unsaturated hydrocarbons or aliphatic alcohols they should be high molecular weight compounds containing at least twenty carbon atoms, such, as, for example, eicosylene, cerotene, melene, polymerized isobutylene, etc., and myricyl alcohol, ceryl alcohol, etc.

The Friedel-Crafts synthesis is preferred for obtaining the alkylated hydroxyaromatic compound, and as a source of the alkyl substituent preference is given to mixed high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax (paraffin wax) of melting point not substantially less than about 120° F., which is predominantly comprised of aliphatic hydrocarbons having a molecular weight of at least 350 and containing at least twenty carbon atoms.

Examples of the aromatic compounds which may be used as starting materials for the alkylation or wax-condensation reaction for obtaining either a product in which the aromatic nucleus is otherwise unsubstituted or a product in which the aromatic nucleus carries a hydroxyl group are as follows: benzene, naphthalene and anthracene (either substituted or unsubstituted); phenol, chlorphenol, resorcinol, hydroquinone, catechol, cresol, hydroxydiphenyl, benzylphenol, alpha- and beta-naphthol and beta-methylnaphthol, anthranol, phenyl-methylnaphthol, etc.; and aryl ethers such as diphenyl ether and naphthyl ether, or mixed alkyl-aryl or aralkyl-aryl ethers such as anisole, naphthylmethyl ether and benzylphenyl ether. Preference in general, as has been previously indicated, is to the mono- and polycyclic aromatics (preferably naphthalene) and to the mono-hydroxyphenols otherwise unsubstituted, particular preference being given to phenol and alpha- and beta-naphthol.

As has been previously indicated, the alkyl-carboxyl substituent may be derived from any aliphatic or cyclo-aliphatic mono- or poly- basic carboxylic acid, illustrative sources of which are acetic, butyric, valeric, heptylic, nonylic, palmitic, and stearic acids, which typify saturated acids, and must be used as the corresponding halogen-acid in which substitution takes place predominantly at the alpha carbon atoms of the aliphatic acid group. Other aliphatic acid substituents may be obtained by using unsaturated acids such as oleic acid, $C_nH_{2n-2}O_2$ in which case substitution on the nucleus takes place at the double bond in the unsaturated acid. Halogenated cyclo-aliphatic acids such as chlornaphthenic acid may be used to obtain compounds in which the alkylated aromatic group carries a cyclo-aliphatic substituent.

As aforesaid, the preferred products contemplated herein are those having multi-functional properties wherein the alkyl substituent in the aryl nucleus contains at least twenty carbon atoms. In this preferred class of compounds, special preference is given to the condensation products derived from alkyl-substituted hydroxyaromatic compounds in which the alkyl substituent is derived from petroleum wax. The details in a typical procedure for synthesizing these so-called wax substituted hydroxyaromatic compounds are described in prior application Serial No. 206,683, now Patent 2,197,833. Briefly, this procedure involves reacting a chlorinated wax such as chlorinated paraffin wax with a phenol in the presence of a Friedel-Crafts catalyst at elevated temperature. The chlorinated wax should have a chlorine content of from 10 per cent to about 20 per cent, and the reaction mixture may contain about three atomic proportions of chlorine (in a chlorwax of 16 per cent chlorine content) to one molecular proportion of phenol. For example, a "wax phenol" obtained from such a reaction mixture may be designated as wax-phenol (3–16). Parenthetical expressions of the type (A–B) will be used hereinafter in connection with the wax-substituted derivatives to designate (a) the number of atomic proportions of chlorine in the chlorinated wax reacted with one mol of aromatic compound and (b) the chlorine content of the chlorinated wax. In the above example A=3 and B=16. The same designation will also apply to the wax-substituted aryl aliphatic carboxylic acids which constitute the ultimate product derived from the corresponding wax-substituted aromatic compound.

The details in the procedure which may be followed in synthesizing alkylated aromatic-aliphatic carboxylic acids of the type contemplated herein will be best understood from the following examples of specific procedures used in synthesizing typical complex acids. It is to be understood in this connection that these examples are for illustration only and that the procedure may be varied by varying the specific reactants and the proportions thereof.

EXAMPLE I

*Preparation of wax-substituted hydroxyphenyl stearic carboxylic acids*

(a) Reaction mixture:

| | Mol |
|---|---|
| Wax-Phenol (3–16) | 1 |
| Oleic Acid | 1 |
| AlCl₃ | 1 |

(b) Condensation of Unsaturated aliphatic carboxylic acids with wax-substituted hydroxyaromatic compounds The wax-phenol (3–16) of the type obtained according to the procedure outlined in Patent 2,197,833, and the oleic acid are mixed together, after which the aluminum chloride is added gradually with stirring at a temperature of about 150° F. The slow addition of the aluminum chloride is necessary to control the evolution of HCl gas. The reaction temperature is then raised to about 250° F., the mixture being held at this temperature during a two-hour period to complete the reaction. The reaction product is then washed with dilute hydrochloric acid to remove the aluminum chloride catalyst, followed by water-washing until neutral. This is followed by steam-treatment to remove any unreacted aliphatic acid. The water-washing is carried out preferably in the presence of a diluent such as benzol or Stoddard Solvent, thereafter distilling the solvent, whereby any entrained water is removed. This is followed by introduction of superheated steam at a temperature of about 390° F. The operation of steam-treating is facilitated by vigorous stirring, the steam being passed through the mixture until the distillate shows a negligible neutralization number, indicating that all unreacted aliphatic acid in the product has been removed. When the steam treatment is finished, which may require about 10 hours, steam vapors are removed from the condensation product by blowing with a non-oxidizing gas such as nitrogen, thereby yielding an anhydrous product. The product of this reaction is wax-substituted (3–16) hydroxyphenol stearic acid and distinguishes from the corresponding stearic acid obtained from chlor-stearic acid in that the substitution of the stearic acid group has been effected at an intermediate point in the chain.

Following the foregoing procedure and using a poly-carboxylic acid such as maleic acid a di-carboxylic product is obtained, in this particular case the product being a wax-substituted hydroxyaryl succinic acid.

Wax-hydroxyphenyl stearic and wax-hydroxyphenyl capric acid have been prepared following the foregoing procedure by employing instead of the unsaturated acid in the oleic mixture one mol of a chlor-acid in the two cases mentioned, the acids being chlor-stearic acid and chlor-capric acid, respectively.

EXAMPLE II

*Preparation of wax-substituted naphthyl aliphatic carboxylic acids*

In Example I above, we have described an illustrative procedure for obtaining wax-substituted hydroxyaryl aliphatic acids. The preparation of wax - substituted aromatic - aliphatic carboxylic acids which are otherwise unsubstituted is illustrated by the following procedure used in preparing such acids wherein the aromatic nucleus is a naphthyl group.

(a) Reaction mixture:

| | Mol |
|---|---|
| Wax-Naphthalene (3–19) | 1 |
| Oleic Acid | 1 |
| AlCl₃ | 1 |

(b) Condensation of wax-substituted naphthalene with aliphatic carboxylic acids

The wax naphthalene (3–19) of the type obtained according to the procedure outlined in the aforesaid patent, 2,197,833, and the oleic acid are mixed together and heated to a temperature of about 150° F. One mol of aluminum chloride is then added to the reaction mixture with stirring to avoid too rapid evolution of HCl, and the temperature is raised to about 250° F., where it is held during a one-hour period to complete the reaction. The reaction mixture is purified in the same manner employed for the purification of the wax-hydroxyaromatic stearic acid described in Example I. Polybasic alkylated aromatic-aliphatic acids can be obtained by using unsaturated polybasic acids such as maleic acid, for example, in the foregoing procedure, which gives an alkylated aryl succinic acid.

Wax-naphthalene alpha-stearic acid can be obtained by using the foregoing procedure and a reaction mixture consisting of one mol of wax-substituted naphthalene, one mol of chlor-stearic acid, and two mols of aluminum chloride.

EXAMPLE III

*Preparation of wax-substituted ether aryl aliphatic carboxylic acid*

Compounds of the type in which an additional substituent group in the alkyl-substituted aromatic-aliphatic carboxylic acids contemplated herein is an alkoxy or an aroxy group can be prepared by condensation of alkylated (such as wax-substituted) aryl ethers with unsaturated aliphatic acids such as oleic acid, using so-called kationoid catalysts, to obtain the final complex acid. Halogenated aliphatic acids or halogenated cyclo-aliphatic acids such as chlor-stearic and chlor-naphthenic acids can be used in place of unsaturated aliphatic acids, using $AlCl_3$ as catalyst for the reaction.

These acids can also be prepared from hydroxy-aryl aliphatic acids of the type derived by the procedure of Example I by alkylating the hydroxyl group. The alkali salt of the hydroxy-aryl aliphatic acid is treated with an alkyl sulfate such as dimethyl sulfate or with alkyl or aryl halides to form the ether derivatives.

These general procedures are more fully illustrated in the following examples:

(a) Reaction mixture:                            Mol
    Wax-Diphenyl Ether (3-16) _____    1
    Oleic Acid _____    1
    $AlCl_3$ _____    1

(b) Condensation of wax-substituted diphenyl ether with aliphatic carboxylic acids One mol of a wax-diphenyl ether (3-16) prepared as outlined in Patent 2,197,833, was mixed with one mol of oleic acid and a mol of $AlCl_3$ was gradually added to the mixture with stirring at a temperature of about 150° F. The reaction was carried to completion by raising the temperature of the mixture to about 250° F. and holding at this point during a one-hour period.

Upon cooling to about 150° F. the reaction mixture was treated with water and kept acidic with aqueous HCl to remove all traces of aluminum, thereafter water-washing the mixture until the washings become neutral to litmus. The operation of water-washing can be facilitated by use of a diluent such as Stoddard Solvent. The finished product is obtained by removal of the diluent by distillation, whereby the removal of entrained water is also effected.

When high molecular weight aliphatic acids such as oleic acid or high molecular weight cyco-aliphatic acids such as naphthenic acid are used in the condensation reaction, the use of superheated steam is required for removal of unreacted aliphatic acid. This treatment is carried out by running steam into the mixture at a temperature of about 200° C. after removal of the $AlCl_3$ by water-washing. The steam-treating is carried out until the distillate shows negligible acidity.

The condensation of halogenated aliphatic acids with diaryl ethers is carried out by the same procedure outlined above for the unsaturated acids.

EXAMPLE IV

*Preparation of ether aryl aliphatic carboxylic acids from hydroxyaryl aliphatic carboxylic acids*

(a) Reaction mixture:                            Mols
    Wax-hydroxy phenyl stearic acid (3-16)___    1
    Metallic sodium _____    2
    Dimethyl sulfate_____    1

(b) Procedure:

One mol of wax-hydroxyphenyl stearic acid (3-16) was dissolved in butyl alcohol and two atomic proportions of metallic sodium were added. The reaction mixture was heated at approximately 170° F. for ½ hour to form the di-sodium salt of wax-hydroxyphenyl stearic acid. The reaction mixture was cooled to room temperature and one mol of dimethyl sulfate added. After stirring for one hour the mixture was heated at approximately 180° F. for two hours to complete the reaction.

Any ester formed in the reaction was saponified by adding aqueous NaOH and refluxing for several hours. The mixture was then acidified with aqueous HCl to give free wax-substituted ether aryl aliphatic acid, which was then washed free of mineral acid. (The addition of Stoddard Solvent facilitates the water-washing.) The finished product was obtained by removal of any diluent (including entrained water) by distillation. The product of the procedure was "wax-methoxyphenyl stearic acid (3-16)."

EXAMPLE V

*Preparation of wax-substituted ester aryl aliphatic carboxylic acids*

Compounds of this type are those in which the aryl nucleus carries an organic ester group in addition to the characterizing "heavy alkyl" group and the characterizing aliphatic carboxylic acid group. They may be prepared from wax-substituted hydroxyaromatic aliphatic acids of the type described in Example I by reaction with a mono- or di- basic acid chloride, using $AlCl_3$ as a catalyst. This reaction yields what we may term the ester (corresponding to the acid chloride) of the wax-hydroxyaromatic-aliphatic carboxylic acid, such as, for example, the phthalyl ester of wax-hydroxyphenyl stearic acid (3-16).

It will be understood that when a mixture of aliphatic hydrocarbon compounds, such as petroleum wax, for example, is used as the source of the alkyl substituents, the resulting composition will be an intimate mixture of compounds or alkyl-substituted aryl aliphatic carboxylic acids, which compounds differ from each other with respect to the nature of the alkyl substitutent. In other words, where the alkylation of the aryl nucleus has been effected with a mixture of aliphatic hydrocarbons, the resulting product will likewise be a mixture of compounds differing with respect to the alkyl substituent but having in common the same aliphatic carboxylic acid group and the same characterizing aryl nucleus discussed above.

Compounds or condensation products of both the oil-miscible and non-miscible types have been prepared, and of the oil-miscible products which have been tested in mineral oil compositions, all have effected improvement in the properties of the oil. The following list is illustrative of the various oil-miscible wax-substituted aryl aliphatic carboxylic acids which we have prepared and tested to demonstrate their value as addition agents for viscous mineral oils.

Table One

| | |
|---|---|
| Wax-hydroxyphenyl stearic acid | (3–14) |
| Wax-cresol stearic acid | (2–16) |
| Wax-naphthol stearic acid | (3–14) |
| Wax-amyl beta-naphthol stearic acid | (3–18) |
| Wax-p-hydroxydiphenyl stearic acid | (2–14) |
| Wax-chlor-hydroxyphenyl stearic acid | (2–16) |
| Wax-methoxyphenyl stearic acid | (3–16) |
| Wax-phenoxyphenyl stearic acid | (3–16) |
| Wax-phenoxyphenyl alpha-stearic acid | (3–16) |
| Wax-naphthyl stearic acid | (2–19) |
| Wax-hydroxyphenyl capric acid | (3–16) |
| Wax-phenoxyphenyl capric acid | (3–16) |
| Wax-chlor-phenoxyphenyl capric acid | (3–16) |
| Phthalyl ester of wax-hydroxyphenyl stearic acid | (3–16) |

It is to be understood that although we have described certain preferred procedure for synthesizing the products contemplated by this invention and have listed a number of illustrative compounds or condensation products which are typical thereof, the invention is not limited to the particular procedures or products but includes within its scope such changes and modifications as fairly come within the spirit of the appended claims.

We claim:

1. As a new composition of matter, an akyl-substituted carbocyclic aromatic-aliphatic carboxylic acid in which a carbon atom of the aliphatic radical of the aliphatic carboxylic acid group is directly attached to a carbon atom of the carbocyclic aromatic nucleus, and in which the alkyl substituent is attached to the carbocyclic aromatic nucleus and contains at least twenty carbon atoms.

2. As a new composition of matter, an alkyl-substituted carbocyclic aromatic-aliphatic carboxylic acid in which a carbon atom of the aliphatic radical of the aliphatic carboxylic acid group is directly attached to a carbon atom of the carbocyclic aromatic nucleus, and in which the alkyl substituent contains at least twenty carbon atoms and is attached to the carbocyclic aromatic nucleus and said carbocyclic aromatic nucleus contains at least one ether substituent.

3. As a new composition of matter, an alkyl-substituted carbocyclic aromatic-aliphatic carboxylic acid in which a carbon atom of the aliphatic radical of the aliphatic carboxylic acid group is directly attached to a carbon atom of the carbocyclic aromatic nucleus, and in which the alkyl substituent is attached to the carbocyclic aromatic nucleus and said carbocyclic aromatic nucleus contains at least one ester substituent.

4. As a new composition of matter, an alkyl-substituted phenol stearic acid, the said alkyl substituent having at least twenty carbon atoms.

5. As a new composition of matter, an alkyl-substituted methoxy-phenyl stearic acid, the said alkyl substituent having at least twenty carbon atoms.

6. As a new composition of matter, the phthalyl ester of an alkyl-substituted hydroxyphenyl stearic acid, the said alkyl substituent having at least twenty carbon atoms.

7. As a new composition, an intimate mixture of alkyl-substituted carbocyclic aromatic-aliphatic carboxylic acids in which a carbon atom of the aliphatic radical of the aliphatic carboxylic acid group is directly attached to a carbon atom of the carbocyclic aromatic nucleus, and in which the alkyl substituents have at least twenty carbon atoms, the compounds differing with each other in the alkyl substituent.

8. As a new composition of matter, an alkyl-substituted nuclear hydroxylated carbocyclic aromatic-aliphatic carboxylic acid in which a carbon atom of the aliphatic carboxylic acid group is directly attached to a carbon atom of the carbocyclic aromatic nucleus and in which the alkyl substituent is attached to the carbocyclic aromatic nucleus.

9. As a new composition of matter, an alkyl-substituted phenyl stearic acid, said alkyl substituent having at least twenty carbon atoms.

ORLAND M. REIFF.
FERDINAND P. OTTO.
JOHN J. GIAMMARIA.
EDWARD A. OBERRIGHT.

REFERENCES CITED

The following references are of record in the file of this patent:

UNITED STATES PATENTS

| Number | Name | Date |
|---|---|---|
| 2,197,833 | Reiff | Apr. 23, 1940 |
| 2,198,274 | Reiff | Apr. 23, 1940 |
| 2,239,533 | Mikeska | Apr. 22, 1941 |
| 2,316,889 | Reiff | Apr. 20, 1943 |

OTHER REFERENCES

Gilman, "Organic Chemistry," edition 2, volume 1, pages 117, 118, 119, 120 and 127, Wiley, N. Y., 1943.